(12) United States Patent
Kumazawa et al.

(10) Patent No.: US 10,345,787 B2
(45) Date of Patent: Jul. 9, 2019

(54) AUTOMATIC CONTROL DEVICE

(71) Applicant: FUJI CORPORATION, Chiryu-shi (JP)

(72) Inventors: Hideyuki Kumazawa, Chiryu (JP); Mitsuhiro Mizuno, Okazaki (JP)

(73) Assignee: FUJI CORPORATION, Chiryu-shi (JP)

( * ) Notice: Subject to any disclaimer, the term of this patent is extended or adjusted under 35 U.S.C. 154(b) by 130 days.

(21) Appl. No.: 15/514,987

(22) PCT Filed: Sep. 29, 2014

(86) PCT No.: PCT/JP2014/075948
§ 371 (c)(1),
(2) Date: Mar. 28, 2017

(87) PCT Pub. No.: WO2016/051478
PCT Pub. Date: Apr. 7, 2016

(65) Prior Publication Data
US 2017/0212497 A1    Jul. 27, 2017

(51) Int. Cl.
*G06F 19/00* (2018.01)
*G05B 19/406* (2006.01)
*G05B 19/05* (2006.01)

(52) U.S. Cl.
CPC ........ *G05B 19/406* (2013.01); *G05B 19/05* (2013.01); *G05B 2219/41025* (2013.01); *G05B 2219/41116* (2013.01); *G05B 2219/41423* (2013.01)

(58) Field of Classification Search
CPC combination set(s) only.
See application file for complete search history.

(56) References Cited

U.S. PATENT DOCUMENTS 4,609,855 A * 9/1986 Andrews ............ G05B 13/0245
  318/561
5,351,205 A    9/1994 Hoos
(Continued)

FOREIGN PATENT DOCUMENTS

EP    0 477 412 A1    4/1992
EP    1 416 345 A1    5/2004
(Continued)

OTHER PUBLICATIONS

Extended European Search Report dated Sep. 29, 2017 in Patent Application No. 14903489.4.
(Continued)

*Primary Examiner* — Kidest Bahta
(74) *Attorney, Agent, or Firm* — Oblon, McClelland, Maier & Neustadt, L.L.P.

(57) ABSTRACT

Automatic control device controls servo motor. Automatic control device is provided with control section that calculates operation amount of servo motor based on the difference between current value and target value of a control amount of servo motor. Automatic control device is also provided with first filter that outputs first output value after using a first filter coefficient or a second filter coefficient to perform filtering of operation amount calculated by control section. Automatic control device is also provided with second filter, arranged in parallel with first filter, that outputs second output value after using a third filter coefficient to perform filtering of operation amount calculated by control section. Automatic control device is also provided with switching section that switches between first output value of first filter and second output value of second filter and sends one of the output values to servo motor.

5 Claims, 3 Drawing Sheets

(56) References Cited

U.S. PATENT DOCUMENTS

| | | | |
|---|---|---|---|
| 5,730,861 A * | 3/1998 | Sterghos | B01D 21/0012 210/86 |
| 6,131,050 A | 10/2000 | Egami et al. | |
| 7,791,305 B2 * | 9/2010 | Iwashita | G05B 19/19 318/601 |
| 2005/0001577 A1 * | 1/2005 | Takahashi | G05B 19/19 318/599 |
| 2016/0252896 A1 * | 9/2016 | Nakamura | G05B 11/011 318/611 |

FOREIGN PATENT DOCUMENTS

| | | |
|---|---|---|
| EP | 2 418 773 A1 | 2/2012 |
| JP | 9-330101 A | 12/1997 |
| JP | 11-184527 A | 7/1999 |
| JP | 2008-509480 A | 3/2008 |
| JP | 2010-198517 A | 9/2010 |

OTHER PUBLICATIONS

European Office Action dated May 15, 2018 in Patent Application No. 14 903 489.4, 5 pages.
International Search Report dated Jan. 13, 2015 in PCT/JP2014/075948 filed Sep. 29, 2014.
Office Action dated Oct. 1, 2018 in corresponding European Patent Application No. 14 903 489.4, 4 pages.

* cited by examiner

AUTOMATIC CONTROL DEVICE

TECHNICAL FIELD

The technology disclosed in the present application relates to an automatic control device.

BACKGROUND ART

An automatic control device is disclosed in patent literature 1 (JP-A-2008-509480). The automatic control device disclosed in patent literature 1 is provided with a first control section that uses output of a first sensor, a second control section that uses output of a second sensor, and a switching section that switches to and from the first control section and the second control section. With the automatic control device of patent literature 1, control is performed by the switching section to control the control target to and from the first control section and the second control section.

SUMMARY

Problem to be Solved

With the automatic control device of patent literature 1, switching is performed to and from the first control section that performs feedback control by the first sensor (position sensor) and the second control section that performs feedback control by the second sensor (pressure sensor). However, even with a similar controller that uses a similar sensor output, when a parameter (coefficient) used for control changes, operation of the control target may become unstable. For example, with a control configuration that inputs the control section output to the control target via a digital filter, when a filter coefficient used by the digital filter is switched, the input value input to the control target changes greatly, meaning that operation of the control target may become unstable. With conventional technology, no countermeasure is disclosed to this instability of a control target. Conventionally, a filter coefficient is changed with control of the control target by the control section stopped, with control to the control target being restarted after the output from the control section has stabilized. Therefore, there is a problem in that the time required to switch includes the standby time until stabilization after control to the control target by the control section has stopped. An object of the present application is to provide an automatic control device that outputs an output of a control section to a control target via a filter, wherein as well as performing stable control when switching filter coefficients, the automatic control control device performs switching of the filter coefficients in a short time.

Means for Solving the Problem

The automatic control device disclosed herein controls a control target. The automatic control device is provided with a control section that calculates an operation amount of the control target based on the difference between a current value and a target value of the control amount of the control target.

Also, the automatic control device is provided with a first filter that outputs a first output value after using a specified filter coefficient to perform filtering of the operation amount calculated by the control section, and a second filter, arranged in parallel with the first filter, that outputs a second output value after using a specified filter coefficient different to the filter coefficient of the first filter to perform filtering of the operation amount calculated by the control section. Further, the automatic control device is provided with a switching section that switches to and from the first output value of the first filter and the second output value of the second filter and sends one of the output values to the control target.

According to such a configuration, various filter coefficients can be selectively input to the first filter and the second filter. For example, the first filter coefficient or the second filter coefficient can be selectively input to the first filter. Also, a third filter coefficient can be input to the second filter. When each filter coefficient is input, a first output value using the first filter coefficient, or a first output value using the second filter coefficient, is output from the first filter. Further, a second output value using the third filter coefficient is output from the second filter. Also, switching to and from the first output value and the second output value is performed by the switching section, and one of the output values is input to the control target. In this manner, the control state of the control target is changed by changing the filter coefficient.

With the above automatic control device, because an operation amount calculated by the same control section is input to each filter, the operation amount input to each filter is a value that is consecutive timewise. Conversely, when a filter coefficient of a filter is changed, with respect to the continuous operation amount (input value), an output value output to the control target is not continuous. As a result, the difference between the current value and the target value of the control amount of the control target is large, the operation amount (input value to the filter) calculated in the control section changes greatly, resulting in instability of the control target. Here, with the filter coefficient, with respect to the change in the input value to the filter, there are coefficients that rapidly change the output value from the filter (coefficients with high responsiveness), and coefficients that gently change the output value from the filter (coefficients with low responsiveness). With a filter coefficient with high responsiveness, it is possible to make the control amount of the control target the target value in a short time, but it is easy for control to become unstable. On the other hand, with a filter coefficient with low responsiveness, it is not possible to control target the target value in a short time, but control is stable. With the above automatic control device, for example, the above first filter coefficient or second filter coefficient can be made a coefficient that changes the output value from the filter rapidly, and the third filter coefficient can be made a coefficient that changes the output value from the filter gently. When a filter coefficient that rapidly changes the output value from the filter is directly changed to a similar filter coefficient that rapidly changes the output value from the filter, the output value sent to the control target may become unstable, causing operation of the control target to be unstable. Conversely, when changing the filter coefficient to a coefficient that gently changes the output value from the filter, even if the operation amount input to the filter changes, the change in the output value sent to the control target is gentle, and operation of the control target is stable.

With the above configuration, when changing the filter coefficient of the first filter from the first filter coefficient to the second filter coefficient, it is possible for the switching section to switch from the first output value to the second output value. By this, the second output value using the third filter coefficient can be input to the control target. Then, the switching section can again switch from the second output value to the first output value. By this, the first output value using the second filter coefficient can be input to the control target. When the switching section changes from the first filter coefficient to the second filter coefficient in this manner, it is possible to interpose the third filter coefficient in between the two filter coefficients. Accordingly, the first output value using the first filter coefficient is switched to the first output value using the second filter coefficient via the second output value using the third filter coefficient.

In this manner, when switching the filter coefficient of the first filter from the first filter coefficient to the second filter coefficient, it is possible to interpose the third filter coefficient of the second filter in between the two filter coefficients. By setting the first filter coefficient, the second filter coefficient, and the third filter coefficient appropriately, it is possible to curtail instability of operation of the control target. That is, when changing from the first filter coefficient to the second filter coefficient, by interposing the third filter coefficient, the characteristics of the output value from the filter can be prevented from changing in a rapid-rapid order, and can be changed in a rapid-gentle-rapid order. By this, rapid changes to operation of the control target are avoided, and operation of the control target is stable. Therefore, stable control can be performed.

Also, when changing the filter coefficient of the first filter from the first filter coefficient to the second filter coefficient, by switching by the switching section, it is possible to change the filter coefficient without stopping control of the control target by the automatic control device. Accordingly, continuous operation of the automatic control device is possible, and switching of the filter coefficient can be performed in a short time.

DESCRIPTION OF EMBODIMENTS

The main features of an embodiment are described below. Note that the technical elements described herein are each independent elements and exhibit utility either independently or in various combinations with each other.

(Feature 1) A first filter coefficient or a second filter coefficient may be input to the first filter, and a third filter coefficient may be input to the second filter. A time constant of the first output value of the first filter when the first filter coefficient or second filter coefficient is input to the first filter may be larger than a time constant of the second output value of the second filter when the third filter coefficient is input to the second filter.

(Feature 2) In a case in which the filter coefficient input to the first filter is switched from the first filter coefficient to the second filter coefficient, or switched from second filter coefficient to the first filter coefficient, in a state with the first output value of the first filter being sent to the control target, the switching section may switch to a state in which the second output value of the second filter is being sent to the control target before switching the filter coefficient of the first filter. Further, the switching section may switch to a state in which the first output value of the first filter is sent to the control target after the filter coefficient input to the first filter has been switched.

(Feature 3) The switching section may decide the timing of switching from a state in which the second output value of the second filter is being sent to the control target to a state in which the first output value of the first filter is being sent to the control target based on the change of the first output value of the first filter measured during the state in which the second output value of the second filter is being sent to the control target.

(Feature 4) The control target may be a servo motor.

Figure 1:
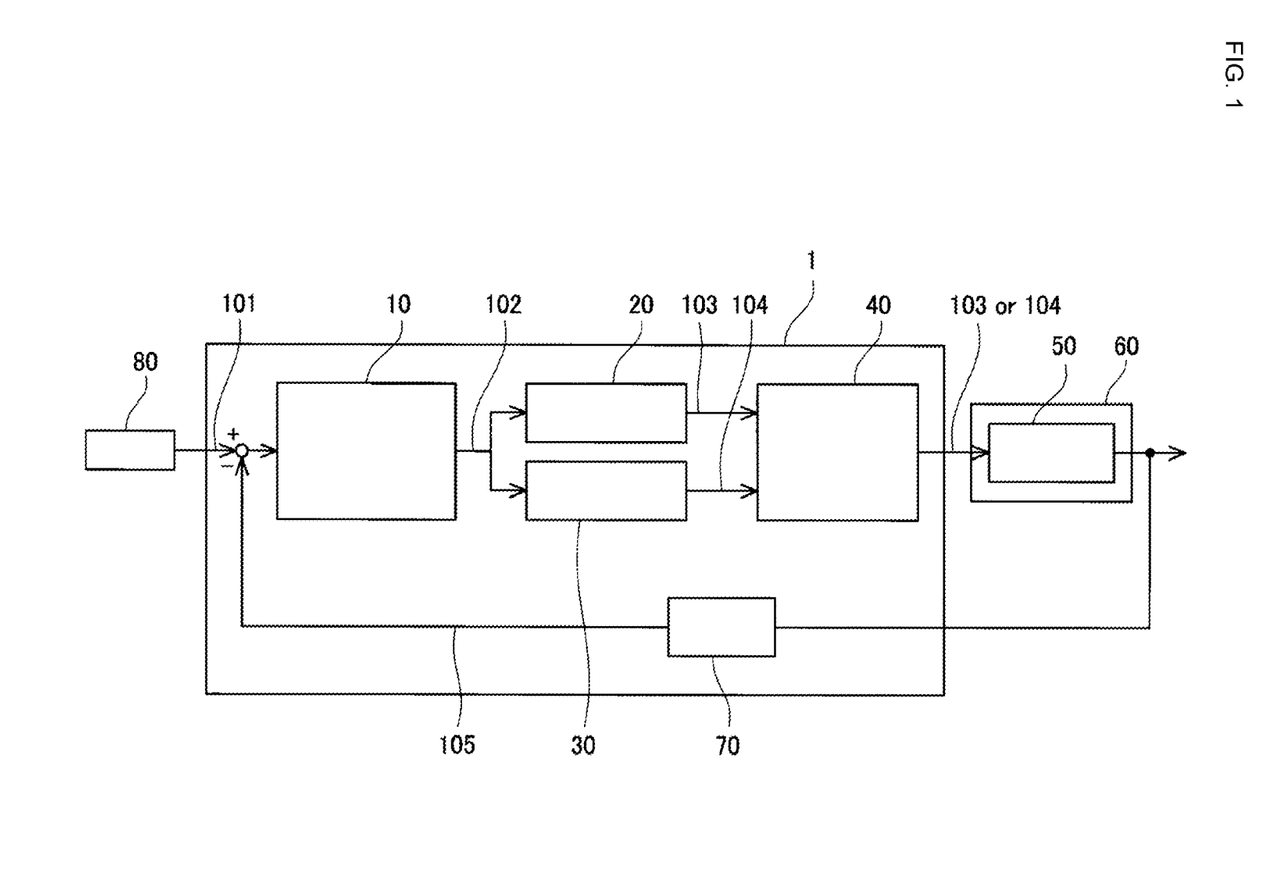
FIG. 1 is a block diagram showing a schematic configuration of an automatic control device.

Embodiments are described below with reference to the attached drawings. As shown in FIG. 1, automatic control device 1 of the present embodiment is provided with control section 10, first filter 20, second filter 30, switching section 40, and detecting section 70. Automatic control device 1 is applied to machine 60 provided with servo motor 50. The control target of automatic control device 1 is servo motor 50. Machine 60 may be, for example, a mounter that mounts electronic components on a board. Automatic control device 1 is able to control operation of machine 60 by controlling operation of servo motor 50.

Control section 10 of automatic control device 1 is connected to input section 80. Control amount target value 101 of the control target is input from input section 80 to control section 10. Control amount target value 101 of the control target is, for example, a target rotation angle of servo motor 50. Also, control section 10 is connected to detecting section 70. Control amount current value 105 of the control target is input from detecting section 70 to control section 10. Control amount current value 105 of the control target is, for example, a rotation angle of servo motor 50 from a reference value to the current value.

Figure 2:
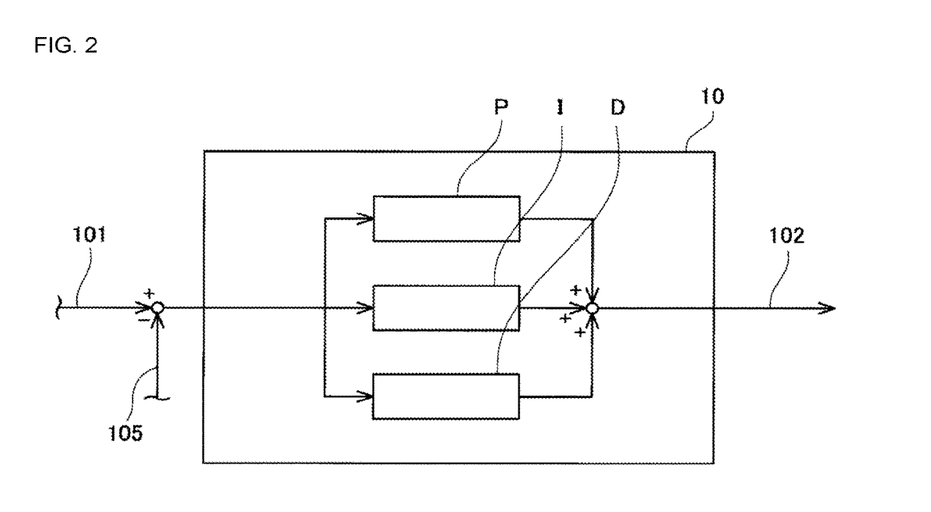
FIG. 2 is a block diagram showing a schematic configuration of a control section.

As shown in FIG. 2, control section 10 is provided with proportional control section P, integral control section I, and differential control section D, and performs well-known PID control. Proportional control section P calculates a value proportional to the deviation of current value 105 and target value 101 of the control target. Integral control section I calculates a value proportional to the integral of the deviation of current value 105 and target value 101 of the control target. Differential control section D calculates a value proportional to the differential of the deviation of current value 105 and target value 101 of the control target. Control section 10, via PID control, calculates operation amount 102 for operating the torque of servo motor 50. Control section 10 calculates operation amount 102 based on target value 101 input from input section 80 and current value 105 input from detecting section 70. Operation amount 102 is a value for controlling the torque of servo motor 50. Control of the torque may be performed by control of a current value. Control section 10 outputs the calculated operation amount 102. Operation amount 102 output from control section 10 is sent to first filter 20 and second filter 30.

As shown in FIG. 1, first filter 20 is connected to control section 10. Operation amount 102 output from control section 10 is input to first filter 20 as an input value. First filter 20 filters operation amount 102 input from control section 10 and outputs it as first output value 103.

First filter 20 is a digital filter. The digital filter removes unnecessary waveform elements from the input value and smoothes the change in the input value over time by performing mathematical processing on the input value that changes over time. For example, a low pass filter, a high pass filter, or a band pass filter may be used as a digital filter. A low pass filter removes waveform elements of a specified frequency or greater. A high pass filter removes waveform elements of a specified frequency or lower. A band pass filter removes waveform elements except for a specified frequency bandwidth. In the present embodiment, a low pass filter is used as first filter 20.

Figure 3:
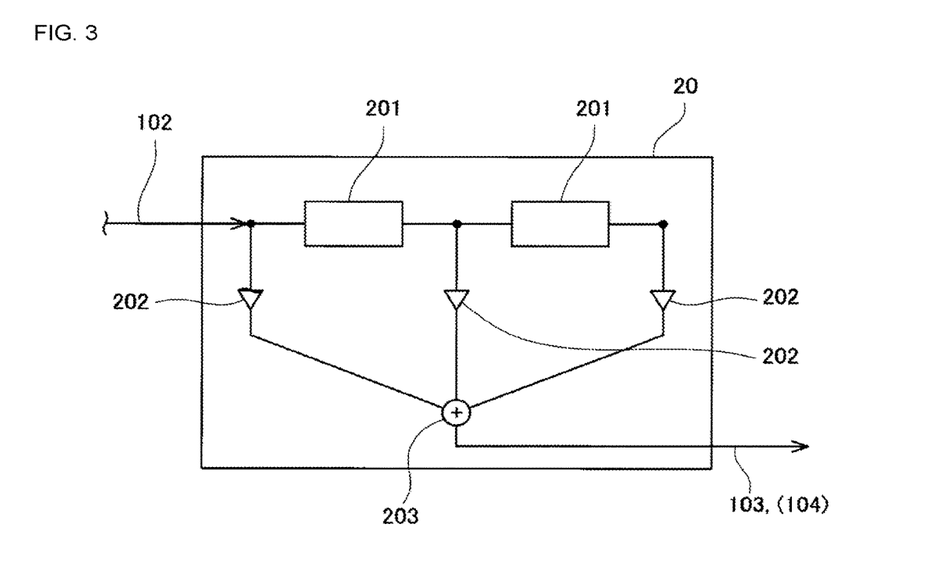
FIG. 3 is a block diagram showing an example of a digital filter.

Also, in the present embodiment, as first filter 20, a digital filter of the model shown in FIG. 3 is used. First filter 20 of the present embodiment is provided with multiple delay sections 201, multiple multiplication sections 202, and addition section 203. Delaying sections 201 delay the input value. That is, delaying sections 201 output an input value of one cycle before the input value of the current time. Multiplication section 202 outputs an input value multiplied by a filter coefficient. Addition section 203 outputs the sum of input values from the multiple multiplication sections 202. An input value of the digital filter is a value obtained by sampling at a specified time internal (cycle).

A model of the digital filter shown in FIG. 3 is represented by equation (1). In equation (1), Y(n) is the output value of digital filter at specified time (n). X(n), X(n−1), and X(n−2) are each input values of a digital filter at specified times (n, n−1, and n−2). $a_0$, $a_1$, and $a_2$ are the filter coefficients to be multiplied by the input value.

$$Y(n)=a_0 \cdot X(n)+a_1 \cdot X(n-1)+a_2 \cdot X(n-2) \quad \text{Equation 1}$$

Second filter 30 is configured the same as first filter 20. Thus, detailed descriptions of second filter 30 are omitted. As shown in FIG. 1, first filter 20 and second filter 30 are arranged in parallel. First filter 20 and second filter 30 are each connected to control section 10 and switching section 40. First filter 20 filters operation amount 102 input from control section 10 and outputs first output value 103. Second filter 30 filters operation amount 102 input from control section 10 and outputs second output value 104. First output value 103 output from first filter 20 and second output value 104 output from second filter 30 are input to switching section 40.

With the digital filters of first filter 20 and second filter 30, filter coefficients ($a_0$, $a_1$, $a_2$) can be changed. A user can freely set filter coefficients ($a_0$, $a_1$, $a_2$) to be multiplied with input values in multiplication section 202. By changing a filter coefficient in the digital filter, the output value output from the digital filter changes.

In the present embodiment, first filter coefficients ($a_{01}$, $a_{11}$, $a_{21}$), second filter coefficients ($a_{02}$, $a_{12}$, $a_{22}$), and third filter coefficients ($a_{03}$, $a_{13}$, $a_{23}$) are used. First filter coefficients and second filter coefficients can be input to first filter 20. A first filter coefficient or a second filter coefficient is selectively input to first filter 20. A third filter coefficient can be input to second filter 30. When a filter coefficient is changed in first filter 20 and second filter 30, the change in the output value of the digital filter may become rapid or gentle.

A time constant of first output value 103 of first filter 20 when the first filter coefficient or second filter coefficient is input to first filter 20 is larger than a time constant of second output value 104 of second filter 30 when the third filter coefficient is input to second filter 30. A frequency band of first output value 103 of first filter 20 when the first filter coefficient or second filter coefficient is input to first filter 20 is larger than a frequency band of second output value 104 of second filter 30 when the third filter coefficient is input to second filter 30. That is, when the first filter coefficient or the second filter coefficient is used, the output value output from the digital filter changes rapidly. Conversely, when the third filter coefficient is used, the output value output from the digital filter changes gently. When the first filter coefficient or the second filter coefficient are used, movement of servo motor 50 is fast, and the control amount of servo motor 50 quickly approaches target value 101. Conversely, when the third filter coefficient is used, movement of servo motor 50 is slow, and the control amount of servo motor 50 slowly approaches target value 101. Accordingly, the response of servo motor 50 with respect to target value 101 is faster when the first filter coefficient or the second filter coefficient is used compared to when the third filter coefficient is used.

As shown in FIG. 1, switching device 40 is connected to each of first filter 20 and second filter 30. First output value 103 output from first filter 20 and second output value 104 output from second filter 30 pass through switching section 40.

Figure 4:
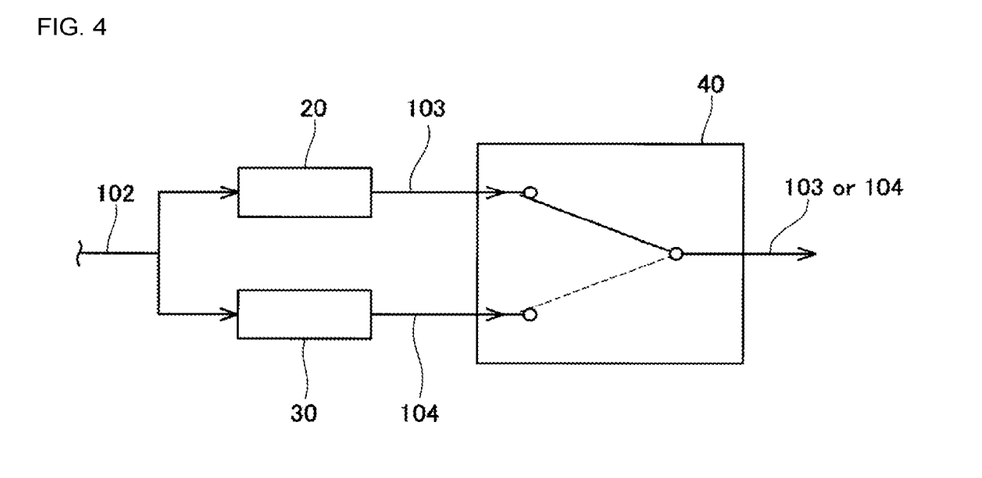
FIG. 4 is a block diagram showing a schematic configuration of a switching section.

As shown in FIG. 4, switching section 40 switches between first output value 103 from first filter 20 and second output value 104 from second filter 30. Switching section 40 switches between first output value 103 and second output value 104 and sends one of the output values to servo motor 50. A switching circuit may be used as switching section 40.

Switching section 40 performs switching of the output value when the filter coefficient input to first filter 20 changes from the first filter coefficient to the second filter coefficient, or when the filter coefficient changes from the second filter coefficient to the first filter coefficient. Switching section 40, in a state with first output value 103 of first filter 20 being sent to servo motor 50, switches to a state with second output value 104 of second filter 30 being sent to servo motor 50 before changing the filter coefficient of first filter 20. Also, switching section 40, in a state with second output value 104 of second filter 30 being sent to servo motor 50, switches to a state with first output value 103 of first filter 20 being sent to servo motor 50 after changing the filter coefficient of first filter 20.

Switching section 40 may be configured to decide the timing of the switching based on the change in an output value. That is, switching section 40 may be configured to decide the timing of switching based on the change of first output value 103 of first filter 20 and/or the change of second output value 104 of second filter 30. Switching section 40 performs switching of output values based on the change of first output value 103 of first filter 20 monitored while second output value 104 of second filter 30 is being sent to servo motor 50. Switching section 40 decides the timing for switching from a state in which second output value 104 of second filter 30 is being sent to servo motor 50 to a state in which first output value 103 of first filter 20 is being sent to servo motor 50 based on the change of first output value 103 of first filter 20.

Servo motor 50 is connected to switching section 40. First output value 103 or second output value 104 output from switching section 40 is input to servo motor 50. First output value 103 and second output value 104 are operation values of the torque of servo motor 50. Servo motor 50 operates based on the input first output value 103 or second output value 104. Servo motor 50 operates to approach target value 101. Servo motor can rotate forwards and in reverse. Servo motor 50 is connected to a power source (not shown) and electric power is supplied to servo motor 50 from the power source. The power source is always supplying electric power to servo motor 50.

Detecting section 70 is connected to servo motor 50 and control section 10. Detecting section 70 detects current value 105 of the control amount of servo motor 50. Specifically, detecting section 70 detects the rotation angle of servo motor 50. The rotation angle from the reference value to the current position is detected. The detection value detected by detecting section 70 (current value 105 of the control amount of servo motor 50) is sent to control section 10. Current value 105 (detection value) is a value obtained by sampling at a specified cycle. Current value 105 (detection value) sent to control section 10 is input to control section 10. Feedback control is performed by returning detecting section 70 returning current value 105 of the control amount of servo motor 50 to control section 10. A well-known encoder may be used as detecting section 70. The encoder is attached to servo motor 50.

Described next is control by the automatic control device provided with the above configuration. With the above automatic control device 1, first, first filter coefficients ($a_{01}$, $a_{11}$, $a_{21}$) are input to first filter 20. Also, third filter coefficients ($a_{03}$, $a_{13}$, $a_{23}$) are input to second filter 30. Also, settings are specified (refer to FIG. 4) such that switching section 40 sends first output value 103 output from first filter 20 to servo motor 50. That is, switching section 40 blocks second output value 104 output from second filter 30.

In this state, at a certain point in time, a target rotation angle (target value 101) for servo motor 50 is input to control section 10 from input section 80. Also, detecting section 70 detects the current rotation angle (current value 105) of servo motor 50. Current value 105 detected by detecting section 70 is input to control section 10. When target value 101 and current value 105 are input to control section 10, control section 10, via PID control, calculates operation amount 102 of the torque of servo motor 50. Operation amount 102 calculated by control section 10 is input to each of first filter 20 and second filter 30.

First filter 20 filters the input operation amount 102 and outputs the result as first output value 103. Here, first filter 20 filters the input operation amount 102 using a first filter coefficient ($a_{01}$, $a_{11}$, $a_{21}$). Also, second filter 30 filters the input operation amount 102 and outputs the result as second output value 104. Second filter 30 filters the input operation amount 102 using a third filter coefficient ($a_{03}$, $a_{13}$, $a_{23}$).

Each of first output value 103 output from first filter 20 and second output value 104 output from second filter 30 are input to switching section 40. Switching section 40 sends first output value 103 output from first filter 20 to servo motor 50. On the other hand, switching section 40 blocks second output value 104 output from second filter 30. First output value 103 is input to servo motor 50. Thus, servo motor 50 operates based on first output value 103.

With automatic control device 1, depending on the circumstances, the filter coefficient used by the digital filter may change. For example, if the construction of machine 60 to which automatic control device 1 is applied changes, the frequency characteristics of machine 60 change. Accordingly, because the unnecessary waveform elements change, the user may change the filter coefficient. In more detail, for example, in a case in which machine 60 is a mounter that mounts electronic components on a board, there are cases in which the type of transport head equipped with suction nozzles that pick up and transport electronic components is changed automatically based on the type of board and/or type of electronic component. Also, there are cases in which components of machine 60 subject to friction wear out as machine 60 ages. In such a case, the weight of machine 60 or the friction between members of machine 60 changes, meaning that the frequency characteristics of machine 60 may change. Accordingly, based on this, the filter coefficient of the digital filter is changed.

In the present embodiment, the user changes the filter coefficient used in first filter 20 from a first filter coefficient ($a_{01}$, $a_{11}$, $a_{21}$) to a second filter coefficients ($a_{02}$, $a_{12}$, $a_{22}$). Accordingly, a second filter coefficient ($a_{02}$, $a_{12}$, $a_{22}$) is input to first filter 20.

Here, when the filter coefficient input to first filter 20 is changed from a first filter coefficient ($a_{01}$, $a_{11}$, $a_{21}$) to a second filter coefficients ($a_{02}$, $a_{12}$, $a_{22}$), there are cases in which the rotation of servo motor 50 becomes unstable. Specifically, when a first filter coefficient or a second filter coefficient is used for first filter 20, first output value 103 for which a time constant is larger is output from first filter 20. That is, when a first filter coefficient or a second filter coefficient is used, with respect to the change in operation amount 102 input from control section 10, first output value 103 for which the change is rapid is output from first filter 20. By this, if the filter coefficient in first filter 20 is changed from the first filter coefficient to the second filter coefficient, first output value 103 output from first filter 20 is changed from first output value 103 for which the change is rapid due to the first filter coefficient, to first output value 103 for which the change is rapid due to the second filter coefficient. If this is done, operation of servo motor 50 changes rapidly, which is undesirable, due to changing from first output value 103 for which the time constant is large due to the first filter coefficient to first output value 103 for which the time constant is large due to the second filter coefficient. As a result, operation of servo motor 50 changes rapidly to approach target value 101, resulting in cases in which rotation of servo motor 50 is unstable.

Thus, to prevent instability in the rotation of servo motor 50, the user, before the filter coefficient in first filter 20 is changed from the first filter coefficient to the second filter coefficient, performs switching using switching section 40 between first output value 103 of first filter 20 and second output value 104 of second filter 30 (refer to FIG. 4). When switching section 40 switches, the output value output from switching section 40 to servo motor 50 switches from first output value 103 of first filter 20 to second output value 104 of second filter 30. Second output value 104 output from second filter 30 is input to servo motor 50. Thus, servo motor 50 operates based on second output value 104. The switching of the output value by switching section 40 is performed in a state with electric power always being supplied to servo motor from the power source (not shown).

A third filter coefficient ($a_{03}$, $a_{13}$, $a_{23}$) is input to second filter 30, and second output value 104 output from second filter 30 using this third filter coefficient has a small time constant. That is, second output value 104 output from second filter 30 using the third filter coefficient changes gently with respect to the change in operation amount input to the second filter from control section 10. Accordingly, if first output value 103 of first filter 20 is switched to second output value 104 of second filter 30 by the switching of switching section 40, the change due to the first filter coefficient changes from first output value 103 with a rapid change to second output value 104 that has a gentle change due to the third filter coefficient. If this is done, the output value sent to servo motor 50 from switching section 40 changes from first output value 103 for which the time constant is large due to the first filter coefficient, to second output value 104 for which the time constant is small due to the third filter coefficient. By this, because the change is changed from first output value 103 with a rapid change to second output value 104 with a gentle change, rapid change in operation of servo motor 50 is curtailed. Thus, rotation of servo motor 50 is stable.

Then, after a specified time has elapsed, the user once again performs switching in switching section 40 to switch between second output value 104 of second filter 30 and first output value 103 of first filter 20. That is, as above, after performing switching from first output value 103 of first filter 20 to second output value 104 of second filter 30 using switching section 40 and then changing the filter coefficient of first filter 20 from the first filter coefficient to the second filter coefficient, the user once again returns from second output value 104 of second filter 30 to first output value 103 of first filter 20 using switching section 40. That is, if the filter coefficient of first filter 20 is changed from the first filter coefficient to the second filter coefficient, first output value 103 output from first filter 20 changes greatly, resulting in instability. While first output value 103 output from first filter 20 is changing greatly, second output value 104 output from second filter 30 is output to servo motor 50. By this, instability of control of servo motor 50 is curtailed. After some time elapses, first output value 103 output from first filter 20 stabilizes. Therefore, after the change in first output value 103 output from the first filter coefficient stabilizes, switching is performed by switching section 40. Also, the switching of the output value by switching section 40 is performed in a state with electric power always being supplied to servo motor from the power source (not shown). By performing switching using switching section 40, once again first output value 103 output from first filter 20 is input to servo motor 50. Thus, servo motor 50 operates based on first output value 103. Note that, the timing of switching from second output value 104 to first output value 103 by switching section 40 may be performed by monitoring first output value 103 from first filter 20 and performing switching when first output value 103 has stabilized. That is, the timing of switching may be decided based on the change of first output value 103 monitored while second output value 104 is being sent to servo motor 50. When the change of first output value 103 has stabilized, the state is switched from a state in which second output value 104 of second filter 30 is being sent to servo motor 50 to a state in which first output value 103 of first filter 20 is being sent to servo motor 50. Whether first output value 103 has stabilized can be determined based on the size of the amplitude of first output value 103.

Here, because, as given above, the second filter coefficient ($a_{02}$, $a_{11}$, $a_{22}$) that was changed from the first filter coefficient is being input to first filter 20, first filter 20 filters operation amount 102 using the second filter coefficient. First filter 20 filters operation amount 102 input from control section 10 using the second filter coefficient and outputs it as first output value 103. First output value 103 output from first filter 20 using the second filter coefficient is sent to servo motor 50 by switching section 40. When this is done, the output value sent to servo motor 50 from switching section 40 changes from second output value 104 for which the time constant is small due to the third filter coefficient, to first output value 103 for which the time constant is large due to the second filter coefficient. By this, because the change is changed from second output value 104 with a gentle change to first output value 103 with a rapid change, rapid change in operation of servo motor 50 is curtailed. Thus, rotation of servo motor 50 is stable.

As is clear from the above descriptions, automatic control device 1 of the present embodiment is provided with first filter 20 that outputs first output value 103 after filtering operation amount 102 of servo motor 50 calculated by control device 10, and second filter 30, arranged in parallel with first filter 20, that outputs second output value 104 after filtering operation amount 102 of servo motor 50 calculated by control device 10. Also, automatic control device 1 is provided with switching section 40 that switches between first output value 103 of first filter 20 and second output value 104 of second filter 40 and sends one of the output values to the control target. According to this configuration, a first filter coefficient or a second filter coefficient can be input to first filter 20. Also, a third filter coefficient can be input to second filter 30. By this, first output value 103 using the first filter coefficient, or first output value 103 using the second filter coefficient, is output from first filter 20. Further, second output value 104 using a third filter coefficient is output from second filter 30. Further, by the switching of switching section 40, it is possible to switch first output value 103 using the first filter coefficient, second output value 104 using the third filter coefficient, and first output value 103 using the second filter coefficient in order. Accordingly, it is possible to switch from first output value 103 for which change is rapid due to the first coefficient to second output value 104 for which change is gentle due to the third filter coefficient, and then to switch again to first output value 103 for which change is rapid due to the second filter coefficient. In this manner, when switching the filter coefficient of first filter 20 from the first filter coefficient to the second filter coefficient, it is possible to interpose the third filter coefficient of second filter 30 in between the two filter coefficients, meaning that it is possible to interpose second output value 2 for which change is gentle. That is, when switching the filter coefficient of a digital filter, it is possible to avoid changing the characteristic of the output value of the digital filter in a rapid-rapid order, and instead change the characteristic of the output value in a rapid-gentle-rapid order. As a result, rapid change in the rotation of servo motor 50 is curtailed, and rotation of servo motor 50 is stable. Accordingly, control by automatic control device 1 is stable. Also, it is possible to change the filter coefficient of first filter 20 from the first filter coefficient to the second filter coefficient in a state with electric power always being supplied to servo motor 50 from a power source (that is, always in a controlled state). By this, the filter coefficient of first filter 20 can be changed without temporarily stopping automatic control device 1, and continuous operation of automatic control device 1 is possible. Accordingly, switching of the filter coefficient can be performed in a short time. For example, in a case in which machine 60 to which automatic control device 1 is applied is a mounter that mounts electronic components, by continuous operation of automatic control device 1, it is possible to continuously mounting electronic components without temporarily stopping machine 60.

The above describes an embodiment, detailed forms are not limited to the above embodiment. In the above embodiment, the model shown in FIG. 3 is described as an example of a digital filter representing first filter 20 or second filter 30, but the configuration is not limited to this example. For example, the quantity of delay sections 201, multiplication sections 202, and addition sections 203 is not particularly limited.

In the above embodiment, servo motor 50 is used as the control target of automatic control device 1, but the control target is not particularly limited. The control target may be changed as is applicable.

In the above embodiment, the rotation angle of servo motor 50 is used as target value 101 input to control section 10, but the configuration is not particularly limited to this case. In another embodiment, for example, the rotation speed, torque, or the like of servo motor 50 may be used as target value 101. Or, for example, a position of a member of machine 60 equipped with servo motor 50 may be used as target value 101. For example, the position of the head that holds components to be mounted on the board may be used as target value 101. Also, multiple target values 101 may be combined.

Also, in the above embodiment, the rotation angle of servo motor 50 is used as current value 105 input to control section 10, but the configuration is not particularly limited to this case. In another embodiment, for example, the rotation speed, torque, or the like of servo motor 50 may be used as current value 105. Or, for example, a position of a member of machine 60 equipped with servo motor 50 may be used as current value 105. For example, the position of the head that holds components to be mounted on the board may be used as current value 105. Also, multiple current values 101 may be combined.

Also, in the above embodiment, a configuration that controls operation of servo motor 50 by operating the torque of servo motor 50 is described, but the configuration is not limited to this. In another embodiment, the rotation angle or rotation speed of servo motor 50 may be operated.

Also, in the above embodiment an example of first filter 20 is described, but the configuration is not limited to this example. For example, first filter 20 may by provided with multiple filters each with a different purpose. For example, first filter 20 may be provided with a vibration control filter, a torque filter, or a prefilter. A vibration control filter, a torque filter, and a prefilter each have a different purpose, and the waveform element to be eliminated according to that purpose is different. With a vibration control filter, unnecessary waveform elements are eliminated to curtail vibration of machine 60 to which automatic control device 1 is applied. With a torque filter, unnecessary waveform elements are eliminated to stabilize the torque of servo motor 50. With a prefilter, unnecessary waveform elements are eliminated to stabilize the rotation of servo motor 50. Also, as with first filter 20, second filter 30 is not limited to the above embodiment.

In the above embodiment, description is given of a case in which the filter coefficient of first filter 20 switched from the first filter coefficient to the second filter configuration, but the configuration is not limited to this. It is possible to stabilize operation of servo motor 50 by performing switching in the same manner as above also in a case in which the filter coefficient of first filter 20 is switched from the second filter coefficient to the first filter coefficient.

The above describes details of specific examples of the present embodiment, but these are only examples and in no way restrict the claims of the disclosure. The techniques disclosed in the claims include various changes and modifications to the specific examples illustrated above. Technical elements described in this specification and in the drawings exhibit technical utility alone or in various combinations, and are not limited to the combination of the described aspects of the application. Also, the examples of the techniques in this specification and the figures achieve multiple purposes at the same time, but also exhibit technical utility when achieving one among those purposes.

REFERENCE SIGNS LIST

1: automatic control device; 10: control section; 20: first filter; 30: second filter 40; switching section 50: servo motor; 60: machine; 70: detecting section; 80: input section; 201: delay section; 202: multiplication section; 203: addition section; 101: target value; 102: operation amount; 103: first output value; 104: second output value; 105: current value; P: proportional control section; I: integral control section; D: differential control section

The invention claimed is:

1. An automatic control device for controlling a control target, comprising:
   a controller that calculates an operation amount of the control target based on a difference between a current value and a target value of the control amount of the control target;
   a first filter that outputs a first output value after using a first specified filter coefficient to perform filtering of the operation amount calculated by the controller,
   a second filter, arranged in parallel with the first filter, that outputs a second output value after using a second specified filter coefficient different to the first filter coefficient of the first filter to perform filtering of the operation amount calculated by the controller; and
   a switching section that switches to and from the first output value of the first filter and the second output value of the second filter and sends one of the output values to the control target.

2. The automatic control device according to claim 1, wherein,
   a first filter coefficient or a second filter coefficient is input to the first filter,
   a third filter coefficient is input to the second filter, and
   a time constant of the first output value of the first filter when the first filter coefficient or the second filter coefficient is input to the first filter is larger than a time constant of the second output value of the second filter when the third filter coefficient is input to the second filter.

3. The automatic control device according to claim 2, wherein
   in a case in which the filter coefficient input to the first filter is switched from the first filter coefficient to the second filter coefficient, or switched from second filter coefficient to the first filter coefficient, in a state with the first output value of the first filter being sent to the control target, the switching section switches to a state in which the second output value of the second filter is being sent to the control target before switching the filter coefficient of the first filter and switches to a state in which the first output value of the first filter is being sent to the control target after the filter coefficient to be input has been switched to the first filter.

4. The automatic control device according to claim 3, wherein
   the switching section decides the timing of switching from a state in which the second output value of the second filter is being sent to the control target to a state in which the first output value of the first filter is being sent to the control target based on the change of the first output value of the first filter measured during the state in which the second output value of the second filter is being sent to the control target.

5. The automatic control device according to claim 1, wherein the control target is a servo motor.

\* \* \* \* \*